United States Patent
Lamb et al.

(10) Patent No.: US 9,749,050 B2
(45) Date of Patent: Aug. 29, 2017

(54) CPRI FRAMELETS

(71) Applicant: BROADCOM CORPORATION, Irvine, CA (US)

(72) Inventors: Lowell D. Lamb, San Ramon, CA (US); Amit Oren, Los Altos Hills, CA (US); Timothy Andrew Ryan, San Francisco, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 201 days.

(21) Appl. No.: 14/624,114

(22) Filed: Feb. 17, 2015

(65) Prior Publication Data

US 2015/0236785 A1 Aug. 20, 2015

Related U.S. Application Data

(60) Provisional application No. 61/941,397, filed on Feb. 18, 2014.

(51) Int. Cl.
*H04B 10/27* (2013.01)
*H04B 10/2575* (2013.01)

(52) U.S. Cl.
CPC ....... *H04B 10/25752* (2013.01); *H04B 10/27* (2013.01)

(58) Field of Classification Search
CPC .......... H04B 10/25753; H04B 10/1125; H04B 10/25752; H04B 10/25759; H04B 10/27; H04W 88/085
See application file for complete search history.

(56) References Cited

U.S. PATENT DOCUMENTS

| 2007/0116046 | A1 | 5/2007 | Liu et al. |
| 2012/0057572 | A1 | 3/2012 | Evans et al. |
| 2013/0051329 | A1 | 2/2013 | Take |
| 2013/0136068 | A1* | 5/2013 | Johansson ........... H04W 88/085 370/329 |

FOREIGN PATENT DOCUMENTS

| CN | 1860811 A | 11/2006 |
| CN | 1960231 A | 5/2007 |
| CN | 101490966 A | 7/2009 |
| CN | 103051575 A | 4/2013 |
| CN | 103581926 A | 2/2014 |

OTHER PUBLICATIONS

Ericson AB, "CPRI Specificatiohn V 4.2—Common Public Radio Interface (CPRI) Interface Specification," Sep. 29, 2010, retrieved from Internet: http://www.cpri.info/spec.html.

* cited by examiner

*Primary Examiner* — Ted Wang
(74) *Attorney, Agent, or Firm* — McDermott Will & Emery LLP

(57) ABSTRACT

A system for providing a reduced common public radio interface (CPRI) framelet link includes one or more cellular towers, each cellular tower including one or more cellular antennas and coupled to a first short CPRI fiber link. An access subsystem is coupled to a baseband pool. The access subsystem is coupled to the first short CPRI fiber link via a first framelet block, and the first framelet block facilitates interfacing the first short CPRI fiber link to the access subsystem.

18 Claims, 8 Drawing Sheets

CPRI FRAMELETS

CROSS-REFERENCE TO RELATED APPLICATIONS

The present application claims the benefit of U.S. Provisional Patent Application Ser. No. 61/941,397, entitled "CPRI Framelets," filed on Feb. 18, 2014, which is hereby incorporated by reference in its entirety for all purposes.

TECHNICAL FIELD

The subject technology generally relates to communications and, in particular, relates to common public radio interface (CPRI) framelets.

BACKGROUND

One class of radio access network architectures exploits point-to-point fiber links between the cell sites and a centralized base-band pool. These links carry common public radio interface (CPRI) traffic between remote radio-heads (RRH) and the pooled base-band functionality. Some of the key characteristics of this solution are described herein. It is known that CPRI is a time-division multiplexing (TDM)-based protocol with a hyper-frame structure, which contains a number of antenna containers (AxCs), control channels, and other protocol elements, and each AxC carries raw in-phase and quadrature (I&Q) data for a particular antenna. Due to the strict synchronization requirements for radio-frame alignment at the RRH (e.g., 65 ns for 3GPP) and the high capacity required to carry traffic for multiple RRHs, Point-to-Point (PtP) fiber is the only practical solution for many deployments that is currently available. CPRI bit-rates (e.g., 9.8304, 6.144, 4.9152, 3.072, 2.4576, 1.2288, 0.6144 Gb/s) differ from both Ethernet and Fiber Channels. The introduction of advanced mobile platforms (e.g., LTE, small cells, femto-cells, etc.) greatly increases the number of cell sites in a given geographical area, which can result in a large increase in the number of back-haul connections. For example, there are projections for an urban cloud radio-access network (CRAN) central office or a baseband pool terminating more than 10 k PtP CPRI fiber links. The deployment of small-cell base stations is highly cost sensitive, since they are designed for a relatively small number of concurrent users and are expected to be deployed in large numbers in many networks.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In one or more aspects of the subject technology, methods and configurations for providing a reduced common public radio interface (CPRI) hyper frame suitable for transport of a small number (e.g., one) of antenna containers (AxCs) and their associated control channels are described. The subject technology mitigates significant drawbacks of the current backhaul solutions for small remote radio-heads (RRHs), especially for cases with a small number of (e.g., one) AxCs per CPRI fiber link. The subject solution avoids using the expensive point-to-point (PtP) fiber links for small number of AxCs, of which much of the link capacity can be wasted. The subject technology leverages the broadband access systems that do not have the bandwidth to support a full CPRI connection. Examples of the broadband access systems includes digital subscriber line (DSL), hybrid fiber-coaxial (HFC), and passive optical network (PON) access systems.

Figure 1A:
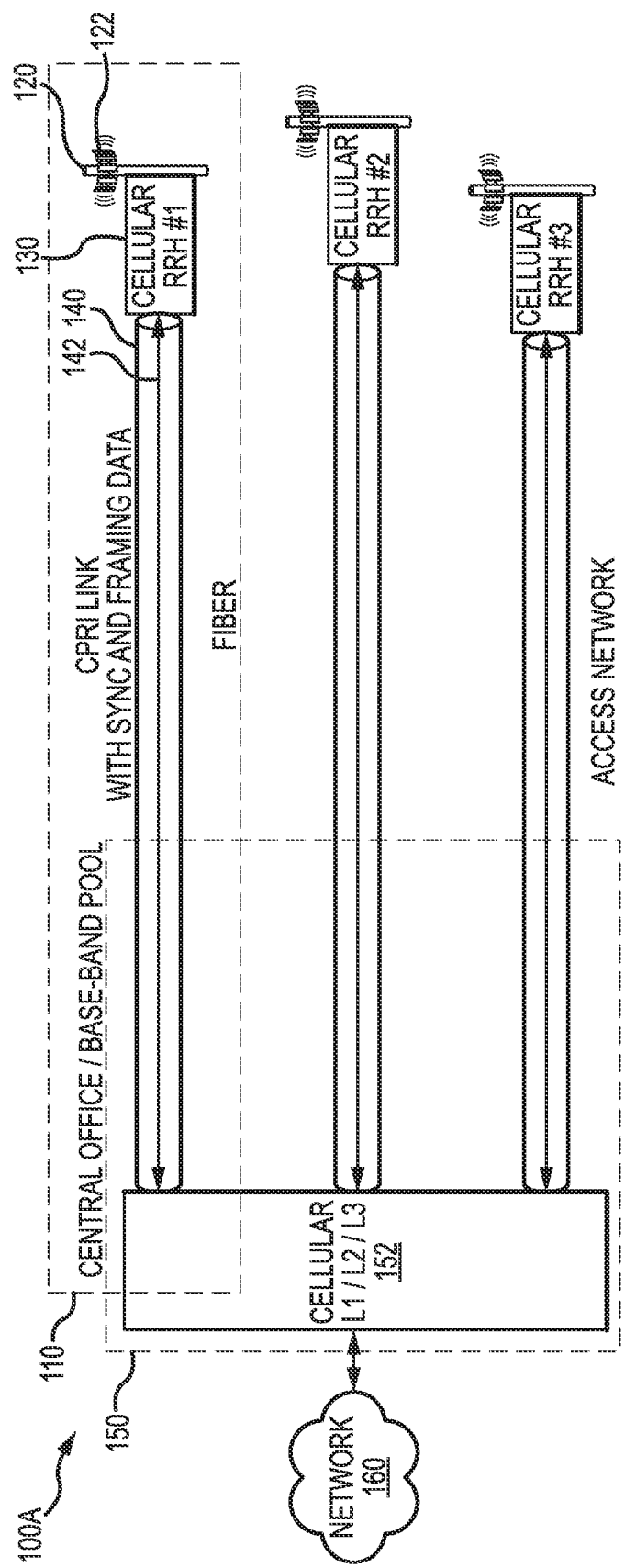
FIGS. 1A-1B are diagrams illustrating examples of a carry common public radio interface (CPRI) link and a CPRI framelet link, in accordance with one or more implementations.
Figure 1B:
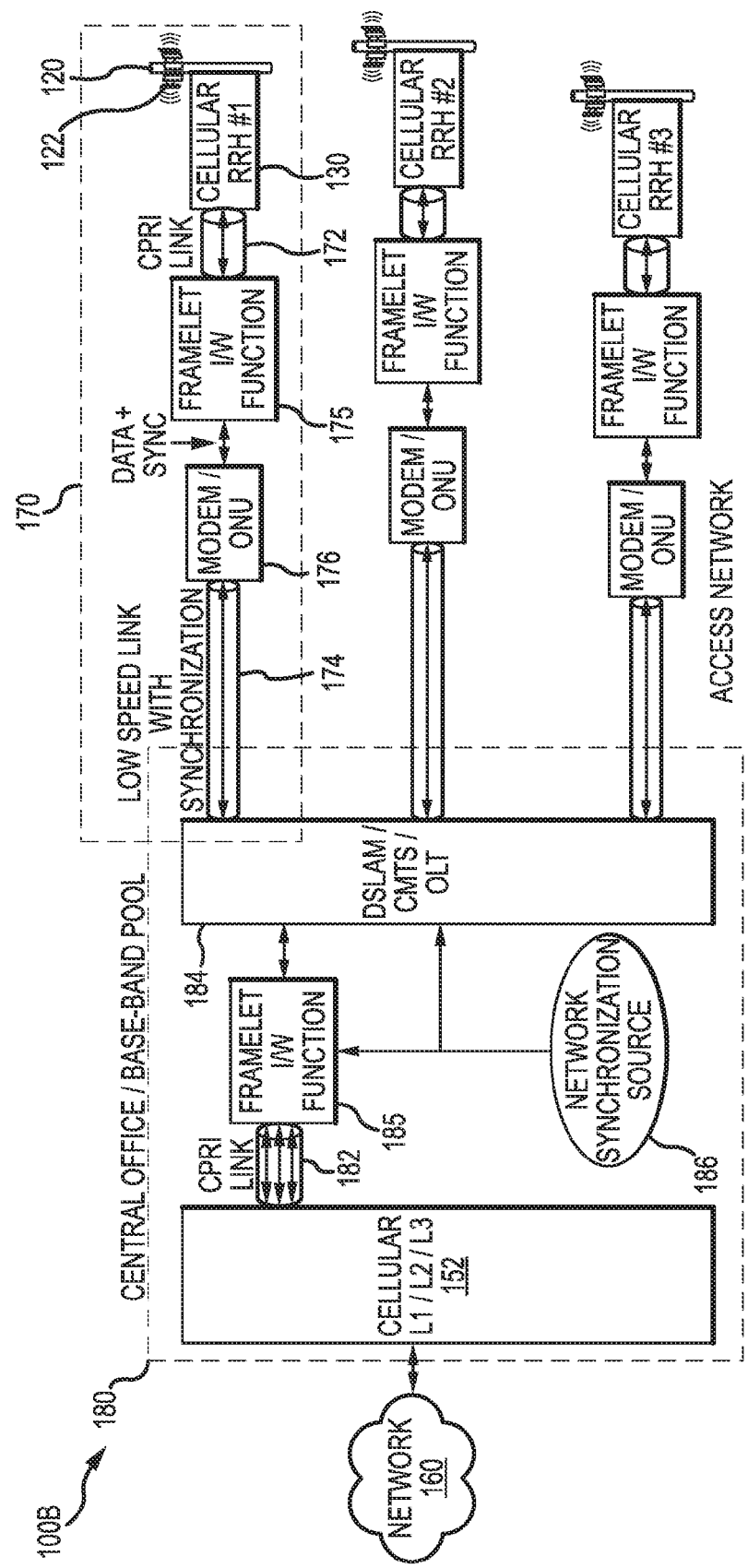

FIGS. 1A-1B are diagrams illustrating examples of a carry common public radio interface (CPRI) access network 100A and a CPRI framelet access network 100B, in accordance with one or more implementations of the subject technology. The CPRI access network 100A shown in FIG. 1A includes a number of CPRI links 110 which can communicate through a central office (e.g., a base-band pool) 150 including a cellular base-station 152 with a network 160 (e.g., the Internet). The cellular base-station 152 can support various wireless protocol layers including L1, L2, and L3 protocol layers. Each CPRI links 110 includes a cellular tower 120, a cellular RRH 130, and a CPRI fiber link 140. The cellular tower 120 includes multiple antennas 122, and the CPRI fiber link 140 is a long (e.g., more than 20 meters and up to a few kilometers) fiber link. CPRI is a time-division multiplexing (TDM)-based protocol with a hyper-frame structure, which contains a number of AxCs, control channels, and other protocol elements. Each AxC carries raw in-phase and quadrature (I&Q) data for a particular antenna.

The cellular RRH 130 receives radio-frequency (RF) signals from the antenna(s) 122 and provides digitized data 142 including the control and digitized I&Q data to the CPRI fiber link 140, which carries the data 142 to the central office 150. The problem with the CPRI access network arises when the number of antennas 122 are small (e.g., one), in which case the operation of the CPRI network become highly inefficient. The subject technology provides a low cost and less complex solution for this particular case by leveraging existing broadband access systems, as described herein.

The CPRI framelet access network 100B, shown in FIG. 1B includes a number of CPRI framelet links 170 communicating through a central office (e.g., a base-band pool) 180 with the network 160. Each CPRI framelet link 170 includes the cellular tower 120, the cellular RRH 130, a short (e.g., a few meters) CPRI fiber link 172, a first framelet block (also referred to as "framelet inter-working function") 175, and an access subsystem including an access system node (e.g., modem) 176 and a low-speed link 174 coupled to a baseband pool 180. The RRH 130 maps the traffic from each antenna 122 to a unique AxC. The access subsystem is coupled to the first short CPRI fiber link 172 via the first framelet block 175 facilitates interfacing the first short CPRI fiber link 172 to the access subsystem. The first framelet block can convert CPRI framelets to Ethernet frames by extracting active data plane and control plane data, as described in more details herein.

The baseband pool 180 includes a second framelet block 185 that can facilitate interfacing the access subsystem to a second short CPRI fiber link 182. The baseband pool 180 further includes the cellular base-station 152 that supports various wireless protocol layers including L1, L2, and L3 protocol layers. Examples of the access subsystem include an Ethernet subsystem such as a digital subscriber line (DSL) subsystem. The DSL subsystem includes one or more modems (e.g., 176), one or more low-speed links (e.g., 174), and a termination system 184 such as a cable-modem termination system (CMTS), an optical line terminal (OLT), or a DSL access multiplexer (DSLAM) at the base-band pool 180. In some aspects, open Base-station architecture initiative (OBSAI) framelets can be transported across the low-speed links 174.

In one or more implementations, the baseband pool 180 includes the termination system 184 and a network synchronizer 186 that provides synchronization signals that are used, for example, to synchronize the first framelet block 175 with the termination system 184. In some aspects, the network synchronizer can use one of IEEE 1588, SyncE, or an equivalent line-timing mechanism. The DSLAM 184 is coupled to the second framelet block 185 and the network synchronizer 186. The second framelet block 185 converts Ethernet frames received from the DSLAM 184 to the CPRI framelets and can aggregate the CPRI framelets for delivery by a short (e.g., <2 m) CPRI fiber link 182 to the cellular base-station 152. In some implementations, the short CPRI fiber link 182 is an aggregated CPRI fiber link including multiple CPRI fiber links.

Figure 2A:
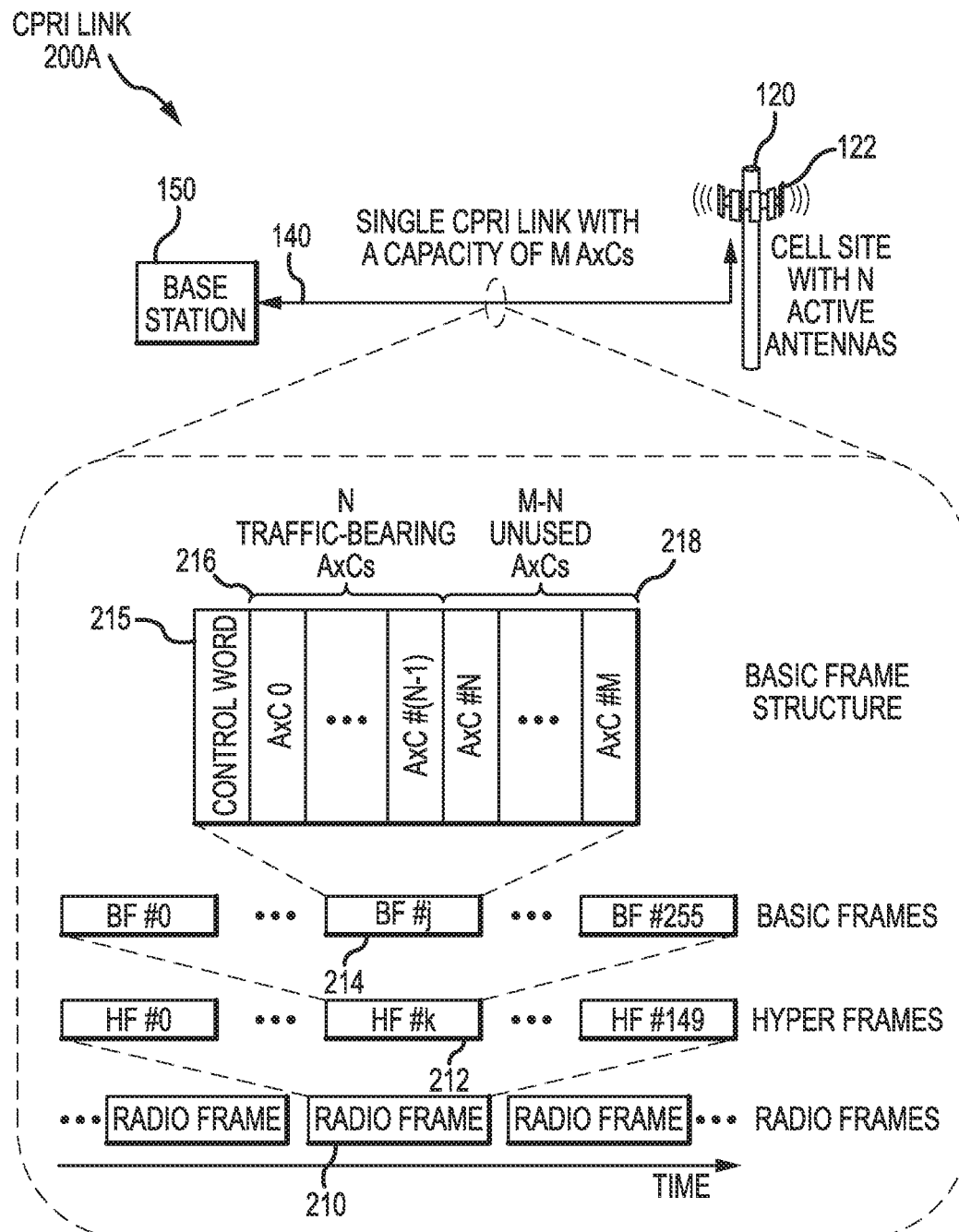
FIGS. 2A-2B are diagrams illustrating examples of a CPRI access network and a CPRI framelet access network, in accordance with one or more implementations.
Figure 2B:
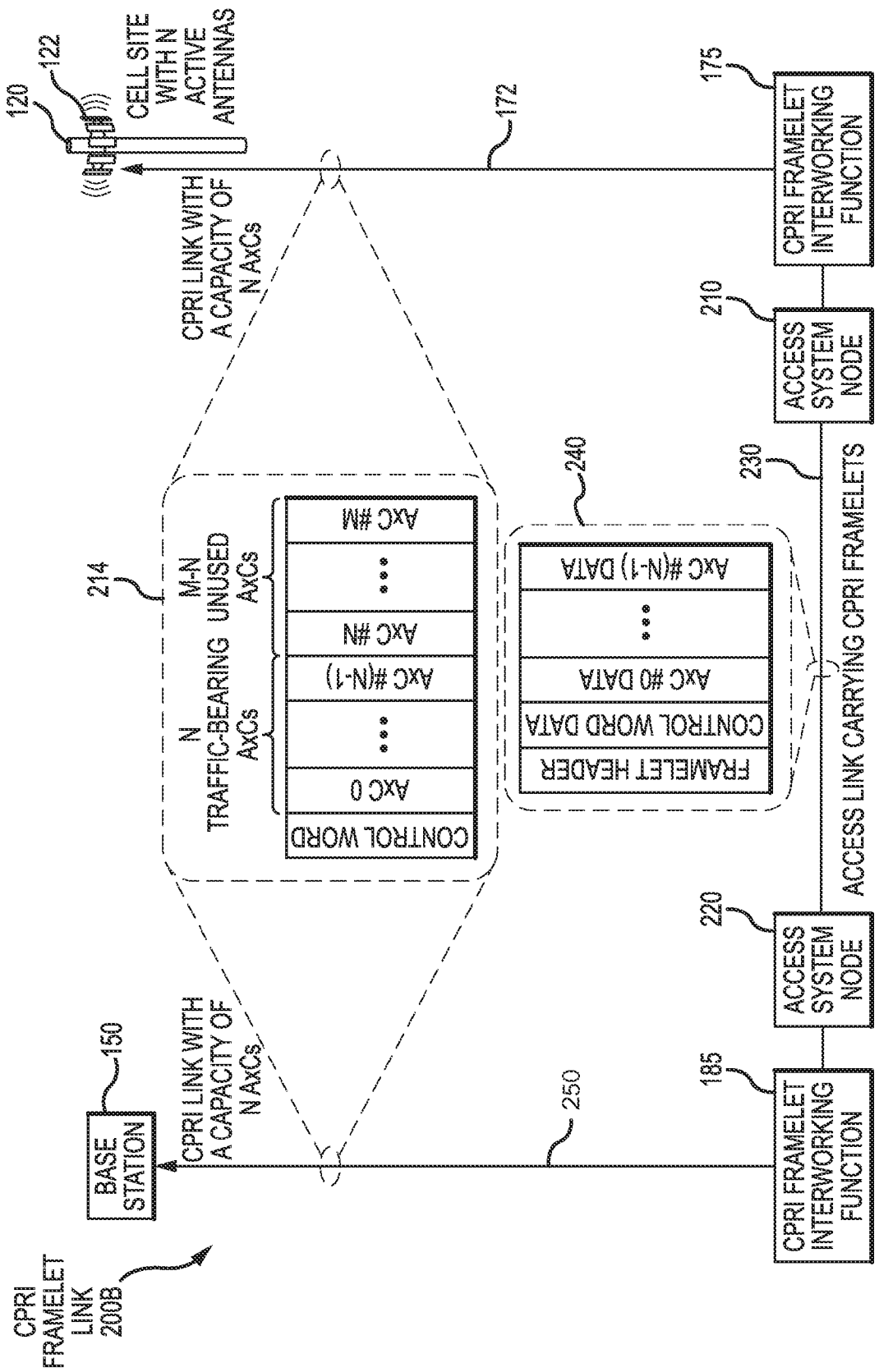

FIGS. 2A-2B are diagrams illustrating examples of a CPRI link 200A and a CPRI framelet link 200B, in accordance with one or more implementations of the subject technology. The CPRI link 200A is similar to the CPRI link 110 of FIG. 1A which includes the cellular tower 120, multiple RF antennas 122, a CPRI fiber link 140 and the base station 150. The CPRI fiber link 140 has the capacity of carrying multiple (e.g., M) AxCs. Each AxC includes a mapping of the traffic from each antenna of the cellular tower 120. The AxCs are included in basic frames (BFs) 214, which are, in turn, parts of hyper frames 212. The hyper frames 212 are the components of radio frames 210 that are transmitted by the CPRI fiber link 140 from the cellular tower 120 to the base station 150 (or in a reverse direction from the base station 150 to the cellular tower 120). Each basic frame 214 includes a control word 215 that carries data for the D control channels, a number of (e.g., N) traffic-bearing AxCs, and multiple (e.g., M-N) unused (e.g., non-traffic-bearing) AxCs.

The shown structure of the basic frame 214 is a conceptual one and the details of structure of the basic frame 214 depend on the CPRI link bit-rate and other factors. It is understood that the CPRI link has both an upstream and a downstream channel, which can carry the similar radio frames 210 in both directions.

The CPRI framelet link 200B, shown in FIG. 2B, is similar to the CPRI framelet link 170 of FIG. 1B and includes the cellular tower 120 including one or more RF antennas 122, the short CPRI link 172, the first framelet block 175, a first access system node 210 (e.g., a modem), an access link 230, a second access system node 220, a second framelet block 185, a second short CPRI fiber 240, and the base station 150. The short CPRI fiber links 172 and 250 carry the radio frames 210 of FIG. 1B including the basic frames 214 in both directions. The access link 230 carry CPRI framelets 240 provided by the first and second framelet blocks 175 and 185. A conceptual structure of a CPRI framelet 240 includes a framelet header, a control word data, and a number of (e.g., N) AxC data. More detailed structure of a CPRI framelet 240 is implementation dependent and is out of scope of the subject disclosure.

In some implementations, the first access system node 210 and the first framelet block 175 can be integrated in a single device. Similarly, the second access system node 220 and the second framelet block 185 can be integrated in another single device. In one or more implementations, a single CPRI stream may be mapped into a single CPRI framelet stream, as shown in FIG. 2B, or into multiple CPRI framelet streams to be carried by the aggregated CPRI short fiber link 182 of FIG. 1B.

Figure 3A:
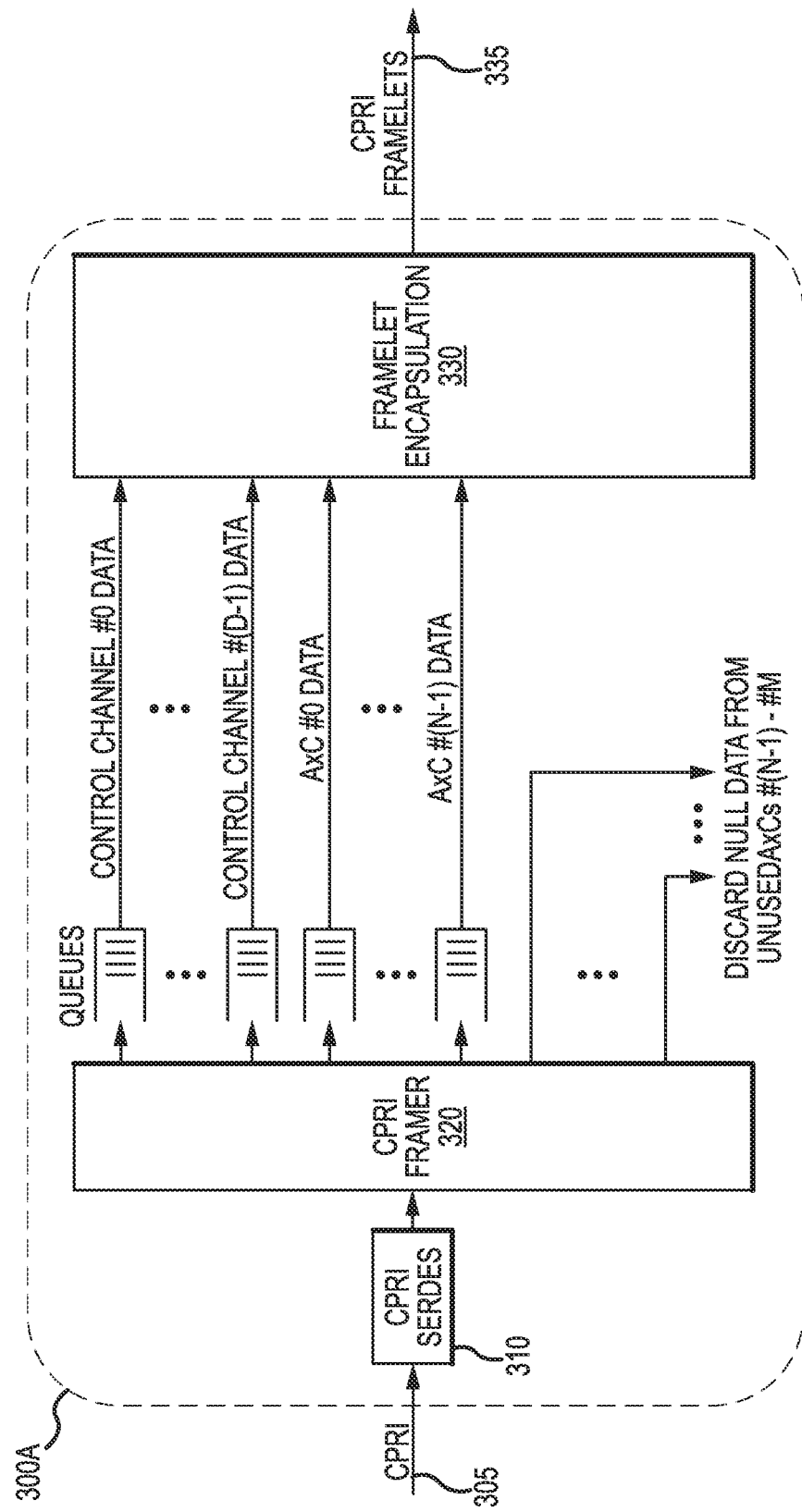
FIGS. 3A-3B are diagrams illustrating examples of a first and a second framelet block, in accordance with one or more implementations.
Figure 3B:
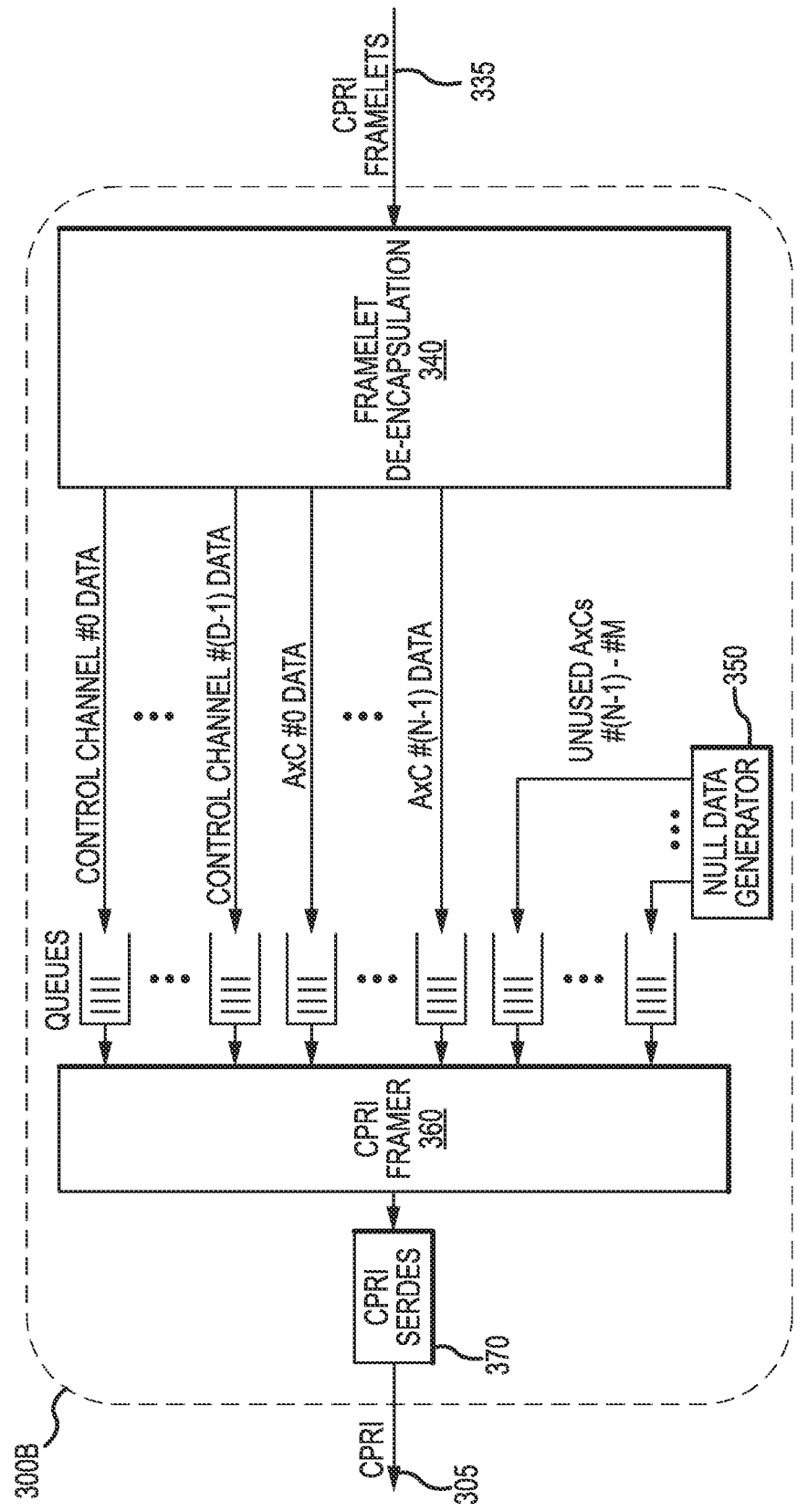

FIGS. 3A-3B are diagrams illustrating examples of first and second framelet blocks 300A and 300B, in accordance with one or more implementations of the subject technology. The first framelet block 300A, shown in FIG. 3A, is a conceptual implementation of the first framelet block 175 of FIGS. 1B and 2B and maps the CPRI data 305 to CPRI framelet data 335. The first framelet block 300A includes a CPRI SerDes 310, a CPRI Framer 320, and a framelet encapsulation module 330. The CPRI SerDes 310 deserialize the CPR data (e.g., radio frames 210 of FIG. 2A) for processing by the CPRI framer 320 that can provide a number of parallel queues. The parallel queues include D (e.g., 0 to D-1) control channel data and N (e.g., 0 to N-1) AxC data, which are provides to the framelet encapsulation module 330.

The CPRI framer 320 discards null data from the unused AxCs (e.g., AxCs numbered N-1 to M). The framelet encapsulation module 330 receives the D control channel data (e.g., control plane data) and the N AxCs data (e.g., data plane) and map these data to CPRI framelets (e.g., 240 of FIG. 2B) that can be carried over a CPRI link with a capacity of M AxCs where N is smaller or equal to M. The synchronization mechanism used in the subject technology can be implementation dependent and is not described here for brevity. In some implementations, a single CPRI stream may be mapped into one or multiple CPRI Framelet streams, as described above.

The second framelet block 300B, shown in FIG. 3B, is a conceptual implementation of the second framelet block 185 of FIGS. The second framelet block 300B includes a framelet de-encapsulation module 340, a null data generator 350, a CPRI Framer 360, and a CPRI SerDes 370. The second framelet block 300B maps CPRI framelets data 355 into CPRI data 305. The framelet de-encapsulation module 340 receives the CPRI framesets 355 and provides D control channel data and N active AxCs. The null data generator 350 generates a number of (e.g., M-N) null data to complete the M AxCs (e.g., N active AxCs and M-N unused AxCs) for delivery to the CPRI framer 360. The CPRI framer 360 processes the D control channel data and M AxCs data to be fed to the CPRI SerDes 370, which convert the parallel data into a serial format data outputted by the CPRI SerDes 370 as the CPRI data 305.

The synchronization mechanism used in the subject technology can be implementation dependent and is not described here for brevity. In some implementations, multiple CPRI framelet streams may be mapped into one or more CPRI streams to be carried by an aggregated short CPRI fiber link (e.g., 182 of FIG. 1B), as described above. In some implementations, the first and second framelet blocks 300A and 300B may be implemented in hardware, firmware and/or software. The software may be executed by a processor such as a local processor or cloud processor.

Figure 4:
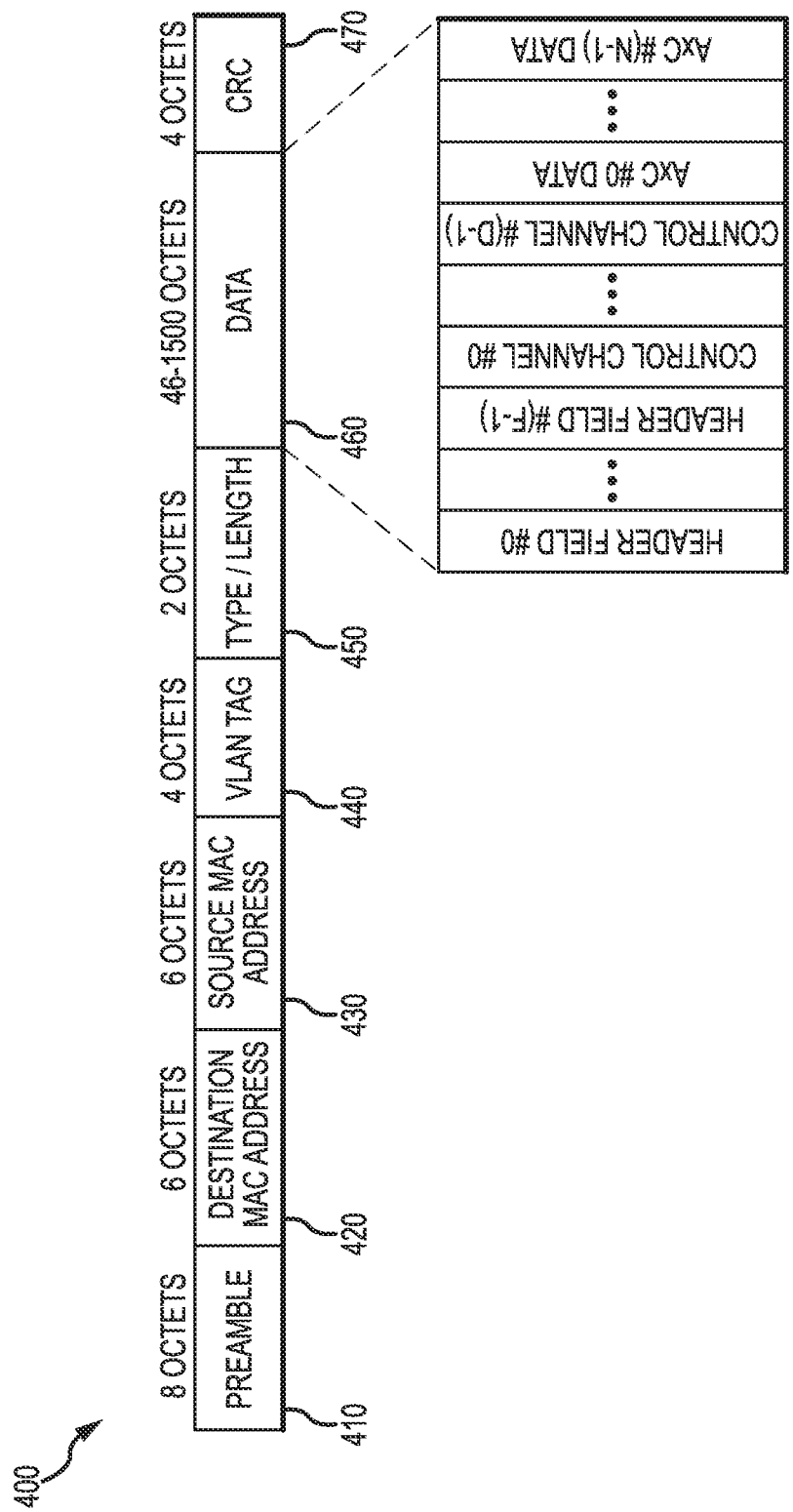
FIG. 4 is a diagram illustrating an example of a CPRI framelet structure, in accordance with one or more implementations.

FIG. 4 is a diagram illustrating an example of a CPRI framelet structure 400, in accordance with one or more implementations of the subject technology. The CPRI framelet structure 400 includes a number of known fields of an Ethernet frame such as a preamble field 410, a destination media access control (MAC) address field 420, a source MAC address field 430, virtual local area network (VLAN) tag field 440, a type/length field 450, a data field 460, and a cyclic redundancy check (CRC) field 470. The structure of the data field 460, as shown in FIG. 4, is specific to the CPRI framelet and includes a CPRI framelet payload including F (e.g., 0 to F−1) header fields, D (e.g., 0 to D−1) control channel fields, and N (e.g., 0 to N−1) AxC data fields.

In one or more implementations of the subject technology, a CPRI link with a capacity of M AxCs, D control channels, and N active AxCs (N≤M) is mapped into an Ethernet flow marked with a VLAN tag of the VLAN tag field 440. The VLAN tag is inserted/removed by the first or second framelet (e.g., interworking function) blocks 175 or 185 of FIG. 1B. The header fields of the data field 460 are also inserted or removed by the first or second framelet blocks 175 or 185. The header fields can contain information such as the CPRI basic frame number (e.g., 0 . . . 255), the CPRI hyper frame number (e.g., 0 . . . 149), a flow index that identifies individual management channels or AxCs, an indicator for the number of I and Q samples in the payload, alignment data used to maintain link synchronization, or other information needed by first or second framelet blocks 175 or 185. A more detailed structure of the header is implementation dependent and is out of scope of the present disclosure.

In some implementations of the subject technology, the CPRI link can be mapped into more than one Ethernet flow, with each flow marked with a unique VLAN tag. This includes the case where each management channel and each AxC is mapped into a separate Ethernet flow, each with a unique VLAN tag.

Figure 5:
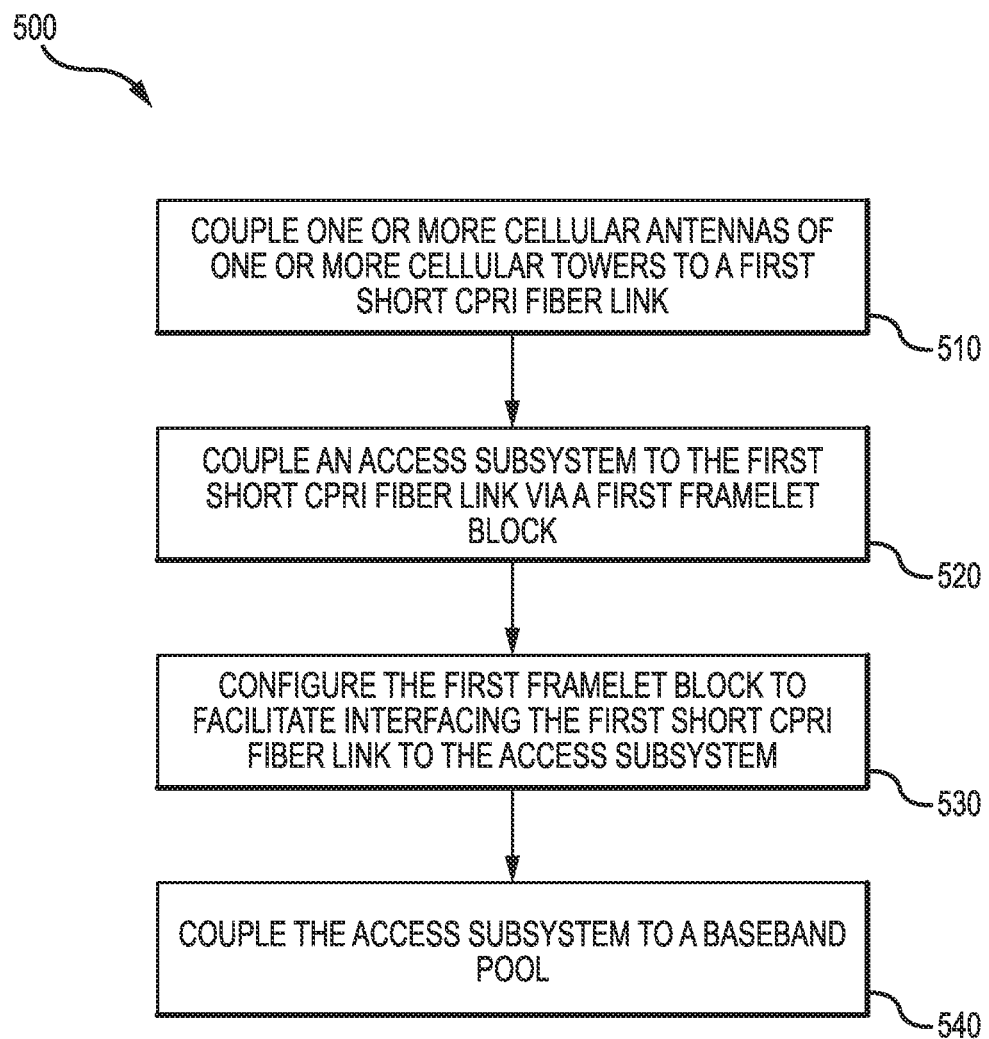
FIG. 5 is a flow diagram illustrating an example of a method for providing CPRI framelet link, in accordance with one or more implementations.

FIG. 5 is a flow diagram illustrating an example of a method 500 for providing CPRI framelet link, in accordance with one or more implementations of the subject technology. For explanatory purposes, the blocks of the example method 500 are described herein as occurring in serial, or linearly. However, multiple blocks of the example method 500 can occur in parallel. In addition, the blocks of the example method 500 need not be performed in the order shown and/or one or more of the blocks of the example method 500 need not be performed.

According to the method 500, one or more cellular antennas (e.g., 122 of FIG. 1B) of one or more cellular towers (e.g., 120 of FIG. 1B) is coupled to a first short CPRI fiber link (e.g., 172 of FIG. 1B) (510). An access subsystem (e.g., including 174, 176, and 184 of FIG. 1B) is coupled to the first short CPRI fiber link via a first framelet block (e.g., 175 of FIG. 1B) (520). The first framelet block facilitates interfacing the first short CPRI fiber link to the access subsystem (530). The access subsystem is coupled to a baseband pool (e.g., 180 of FIG. 1B) (540).

Those of skill in the art would appreciate that the various illustrative blocks, modules, elements, components, and methods described herein can be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect can apply to all configurations, or one or more configurations. An aspect can provide one or more examples of the disclosure. A phrase such as an "aspect" refers to one or more aspects and vice versa. A phrase such as an "embodiment" does not imply that such embodiment is essential to the subject technology or that such embodiment applies to all configurations of the subject technology. A disclosure relating to an embodiment can apply to all embodiments, or one or more embodiments. An embodiment can provide one or more examples of the disclosure. A phrase such an "embodiment" can refer to one or more embodiments and vice versa. A phrase such as a "configuration" does not imply that such configuration is essential to the subject technology or that such configuration applies to all configurations of the subject technology. A disclosure relating to a configuration can apply to all configurations, or one or more configurations. A configuration can provide one or more examples of the disclosure. A phrase such as a "configuration" can refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system for providing a reduced common public radio interface (CPRI) framelet link, the system comprising:
    one or more cellular towers, each cellular tower including one or more cellular antennas and coupled to a first short CPRI fiber link; and
    an access subsystem coupled to a baseband pool,
    wherein:
    the access subsystem is coupled to the first short CPRI fiber link via a first framelet block, and
    the first framelet block is configured to facilitate interfacing the first short CPRI fiber link to the access subsystem.

2. The system of claim 1, wherein the baseband pool comprises a cellular base-station, and wherein the cellular base-station is configured to support various wireless protocol layers including L1, L2, and L3 protocol layers.

3. The system of claim 1, wherein the access subsystem comprises a broadband subsystem, wherein the broadband subsystem comprises an Ethernet subsystem, wherein the access subsystem comprises a digital subscriber line (DSL), a passive optical network (PON), or a hybrid fiber-coaxial (HFC) sub-system.

4. The system of claim 3, wherein the access subsystem comprises one or more modems, one or more low speed links, and one of a DSL access multiplexer (DSLAM), a cable-modem termination system (CMTS), or an optical line terminal (OLT), and wherein open base-station architecture initiative (OBSAI) framelets are transported across the one or more low-speed links.

5. The system of claim 4, wherein the baseband pool comprises a network synchronizer, wherein the network synchronizer is configured to provide synchronization signals, and wherein the first framelet block is synchronized with the DSLAM, the CMTS, or the OLT, and wherein the network synchronizer is configured to use one of IEEE 1588, SyncE, or an equivalent line-timing mechanism.

6. The system of claim 5, wherein the baseband pool includes a second framelet block that is configured to facilitate interfacing the access subsystem to a second short CPRI fiber link, wherein the second framelet block is configured to convert Ethernet frames to CPRI framelets, and wherein the second framelet block is configured to aggregate the CPRI framelets received from the DSLAM, the CMTS, or the OLT.

7. The system of claim 6, wherein the DSLAM, the CMTS, or the OLT is included in the baseband pool and is coupled to the second framelet block and the network synchronizer.

8. The system of claim 6, wherein each of the first and second short CPRI fiber links comprises a CPRI fiber link with a length of less than 2 meters, and wherein the second short CPRI fiber link comprises an aggregated CPRI fiber link including multiple CPRI fiber links.

9. The system of claim 1, wherein each cellular tower is coupled to the first short CPRI fiber link through a cellular remote radio head (RRH), and wherein the first framelet block is configured to convert CPRI framelets to Ethernet frames by extracting active data plane and control plane data.

10. A method for providing a reduced common public radio interface (CPRI) framelet link, the method comprising:
    coupling one or more cellular antennas of one or more cellular towers to a first short CPRI fiber link;
    coupling an access subsystem to the first short CPRI fiber link via a first framelet block;
    configuring the first framelet block to facilitate interfacing the first short CPRI fiber link to the access subsystem; and
    coupling the access subsystem to a baseband pool.

11. The method of claim 10, wherein the baseband pool comprises a cellular base-station, and wherein the cellular base-station supports various wireless protocol layers including L1, L2, and L3 protocol layers.

12. The method of claim 10, wherein coupling the access subsystem comprises coupling an Ethernet subsystem, wherein coupling the access subsystem comprises coupling a digital subscriber line (DSL), a passive optical network (PON), or a hybrid fiber-coaxial (HFC) subsystem.

13. The method of claim 12, wherein coupling the access subsystem comprises coupling one or more modems, one or more low speed links, and one of a DSL access multiplexer (DSLAM), a cable-modem termination system (CMTS), or an optical line terminal (OLT), and wherein the method comprises transporting open base-station architecture initiative (OBSAI) framelets across the one or more low-speed links.

14. The method of claim 13, wherein the baseband pool comprises a network synchronizer, wherein the method comprises configuring the network synchronizer to:
    provide synchronization signals;
    use one of IEEE 1588, SyncE, or an equivalent line-timing mechanism; and
    synchronize the first framelet block with the DSLAM, the CMTS, or the OLT.

15. The method of claim 14, wherein the baseband pool includes a second framelet block, and wherein the method comprises configuring the second framelet block to:
    facilitate interfacing the access subsystem to a second short CPRI fiber link;
    convert Ethernet frames to CPRI framelets; and
    aggregate the CPRI framelets received from the DSLAM, the CMTS, or the OLT.

16. The method of claim 15, wherein the DSLAM, the CMTS, or the OLT is included in the baseband pool, and the method comprises coupling the DSLAM to the second framelet block and the network synchronizer.

17. The method of claim 15, wherein each of the first and second short CPRI fiber links comprises a CPRI fiber link with a length of less than 2 meters, and wherein the second short CPRI fiber link comprises an aggregated CPRI fiber link including multiple CPRI fiber links.

18. The method of claim 10, further comprising:
   coupling each cellular tower to the first short CPRI fiber link through a cellular remote radio head (RRH); and
   configuring the first framelet block to convert CPRI framelets to Ethernet frames by extracting active data plane and control plane data.

* * * * *